P. R. COLLIER.
HEADLIGHT FOR AUTOMOBILES OR OTHER VEHICLES.
APPLICATION FILED JAN. 6, 1921.
1,399,195.  Patented Dec. 6, 1921.
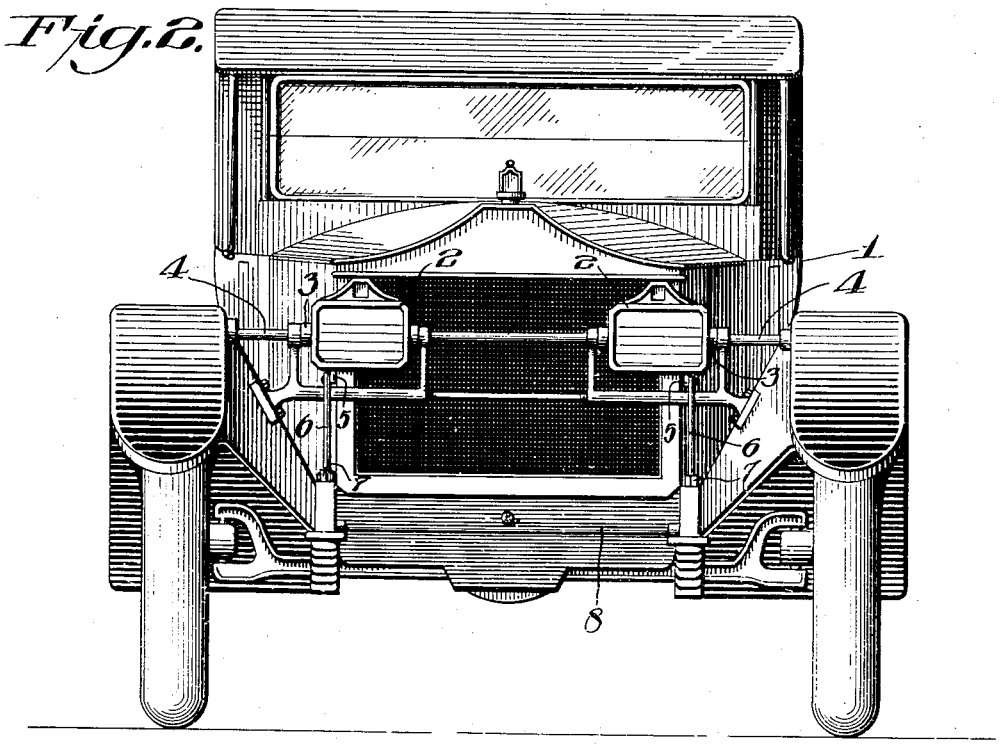
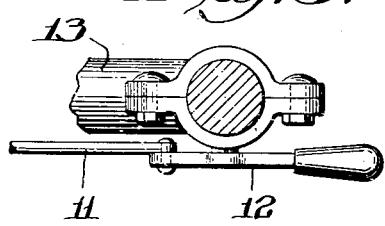
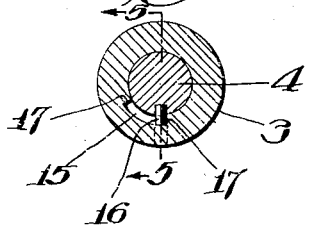
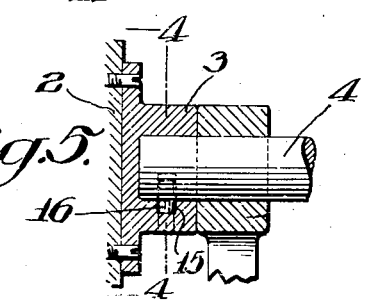

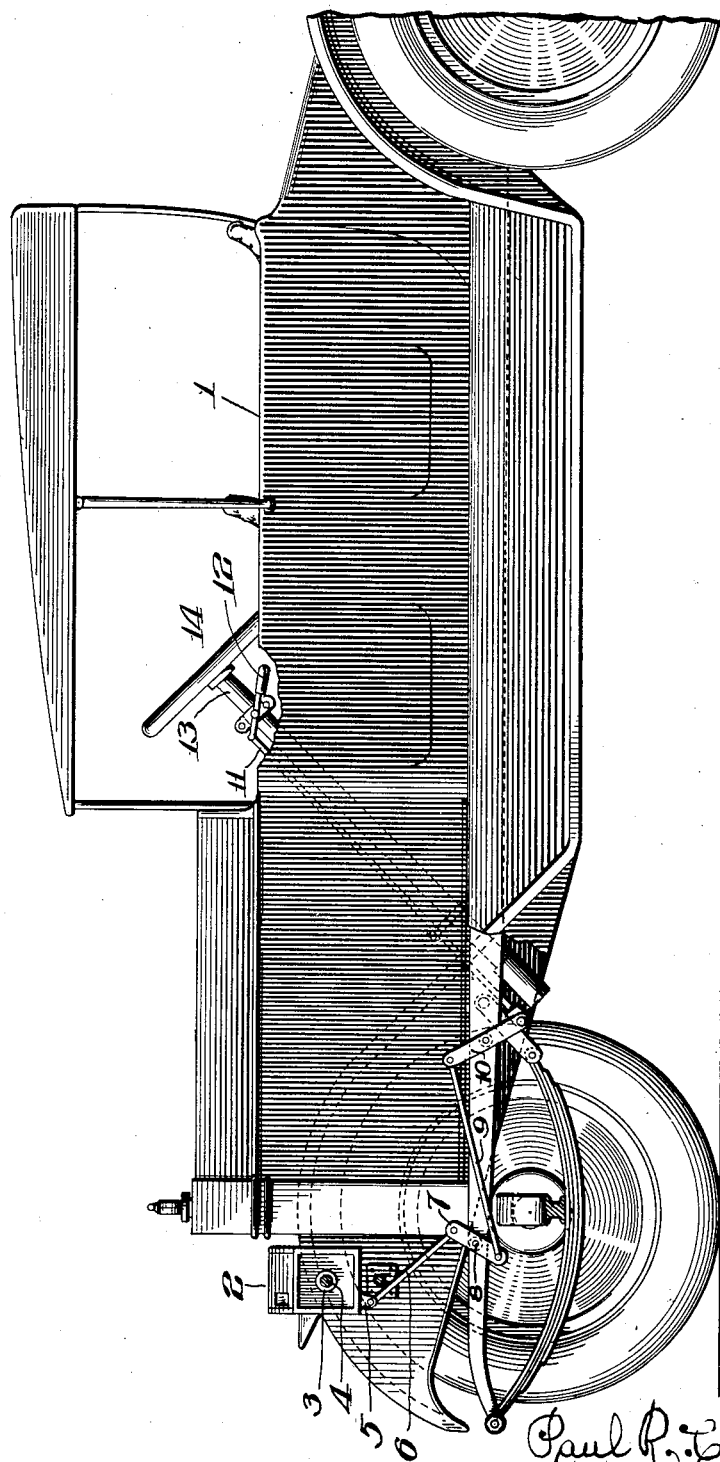

UNITED STATES PATENT OFFICE.

PAUL R. COLLIER, OF PHILADELPHIA, PENNSYLVANIA.

HEADLIGHT FOR AUTOMOBILES OR OTHER VEHICLES.

1,399,195.     Specification of Letters Patent.     Patented Dec. 6, 1921.

Application filed January 6, 1921. Serial No. 435,328.

*To all whom it may concern:*

Be it known that I, PAUL R. COLLIER, a citizen of the United States, residing in the city and county of Philadelphia, State of Pennsylvania, have invented a new and useful Headlight for Automobiles or other Vehicles, of which the following is a specification.

My invention consists of an attachment for an adjustable headlight of an automobile or other vehicle, and the body of the latter for moving said headlight so that its illumination may be cast at different angles in front of the vehicle as occasion may require, and to limit the motion of the headlight, and to retain it in the position to which it may be set.

The invention is satisfactorily illustrated in the accompanying drawings, but the important instrumentalities thereof may be varied, and so it is to be understood that the invention is not limited to the specific details shown and described, as long as they are within the spirit or scope of the claim.

Figure 1 represents a side elevation of a headlight of an automobile and appurtenances embodying my invention.

Fig. 2 represents a front elevation thereof.

Fig. 3 represents a horizontal section of a steering column and the headlight tilting means attached thereto on an enlarged scale.

Fig. 4 represents a section of the lamp bearings on line 4—4 Fig. 5, on an enlarged scale.

Fig. 5 represents a section of the lamp bearings on line 5—5 Fig. 4.

Similar numerals of reference indicate corresponding parts in the figures.

Referring to the drawings.

1 designates the body of an automobile, and 2 designates the head lights thereof, the latter having hubs 3 which are mounted freely on the horizontally and transversely extending sectional shaft 4 which is supported on proper members of the body.

On the frames of said headlights are the ears 5 with which are pivotally connected the upper ends of rods or bars 6 whose lower ends are pivotally connected respectively with opposite links 7 which are connected with the horizontally and transversely extending rotatable shaft 8 which is mounted on proper members of the vehicle below the headlights where by the operation of said links both headlights may have their angularity changed so as to cast the illumination of the same directly ahead or angularly downwardly on the road as may be desired in running the vehicle.

Connected pivotally with one of said links 7 is the rod or bar 9 which is connected pivotally with the auxiliary link 10, the latter being mounted pivotally on a proper portion on a side of the vehicle rearward of said link 7 and having connected pivotally with it the rod or bar 11 whose upper end is connected pivotally with the lever 12 which is mounted on the supporting column 13 of the operating and steering wheel 14 employed in vehicles of the class, said lever 12 being within reach of the chauffeur or driver of the vehicle so that by the operation of the same the headlights may be moved to have their angles changed as may be desired for the purpose hereinbefore stated, the same being accomplished in an inexpensive, convenient, easy and quick manner.

On the bores of the hubs 3 are the short segmental slots 15 and on adjacent portions of the sectional shaft 4 are the studs 16 which are adapted to enter freely said segmental slots 15, it being noticed that the terminals of the latter form the shoulders 17 which are spaced apart to such extent preferably less than a quarter of a circle, so that when the headlights are rotated in one direction, the proper shoulders 17 are adapted to abut the studs 16, and when they are rotated in reverse direction the other shoulders 17 are adapted to abut said studs. By these means the degrees of rotation of the hubs and consequently of the headlights are limited and so the latter are held in the position to which they are adjusted angularly whether for throwing the illumination of the head lights dead ahead or downwardly obliquely as the case may be, it being seen that a short throw of the lever 12 with the mechanism intermediate of the same and the headlights is sufficient to move the latter with ease and rapidity.

Having thus described my invention what I claim as new and desire to secure by Letters Patent, is:—

A headlight for a vehicle, a shaft on the vehicle adapted to have said headlight mounted rotatably thereon, a lever mounted on and operative in the vehicle, and means intermediate of said lever and headlight adapted to change the angularity of the latter, said headlight having a hub the latter being mounted on said shaft and having its bore provided with a segmental slot, and said shaft having on its side an angularly extending member adapted to freely enter said slot, the terminals of the latter forming spaced apart shoulders with either of which said angularly extending member may abut whereby the rotary movement of the headlight may be limited in either of the different angular positions in which it may be set.

PAUL R. COLLIER.

Witnesses:
E. HAYWARD FAIRBANKS,
C. D. McVAY.